United States Patent [15] 3,700,821

Savage [45] Oct. 24, 1972

[54] DIGITAL CONSTANT-PERCENT-BREAK PULSE CORRECTING SIGNAL TIMER

[72] Inventor: Bruce Russell Savage, Boulder, Colo.

[73] Assignee: Bell Telephone Laboratories, Incorporated, Murray Hill, N.J.

[22] Filed: Nov. 9, 1970

[21] Appl. No.: 87,851

[52] U.S. Cl. .............................179/16 E, 179/16 EA

[51] Int. Cl. ..............................................H04g 1/36

[58] Field of Search...179/16 E, 16 EA, 16 EC, 16 F, 179/15 AD; 325/38 A; 235/92 CC, 92 PB; 307/265; 328/37, 164

[56] References Cited

UNITED STATES PATENTS

| | | | |
|---|---|---|---|
| 3,092,691 | 6/1943 | Burns et al. | 179/16 EA |
| 3,544,724 | 12/1970 | Pento | 179/16 E |
| 3,504,290 | 3/1970 | Earle | 235/92 CC |
| 3,452,220 | 6/1969 | Fritschi | 179/16 E |

*Primary Examiner*—Kathleen H. Claffy
*Assistant Examiner*—Randall P. Myers
*Attorney*—R. J. Guenther and Edwin B. Cave

[57] ABSTRACT

In a constant-percent-break pulse corrector circuit, pulses to be corrected are applied to first and second digital counters, the first of which counts a control clock signal at a first rate set in accordance with the minimum rate of pulses to be corrected. Circuitry including logic means is responsive to the input pulses and to the operation of the first counter for initiating the operation of the second counter, first at the minimum control clock rate and then at a second rate set in accordance with the maximum rate of pulses to be corrected. The transition between rates is determined by the rate of input pulses. Circuitry responsive to the outputs from the counters generates a pulse train with a constant-percent-break ratio irrespective of the rate of the input pulses.

4 Claims, 1 Drawing Figure

PATENTED OCT 24 1972 3,700,821
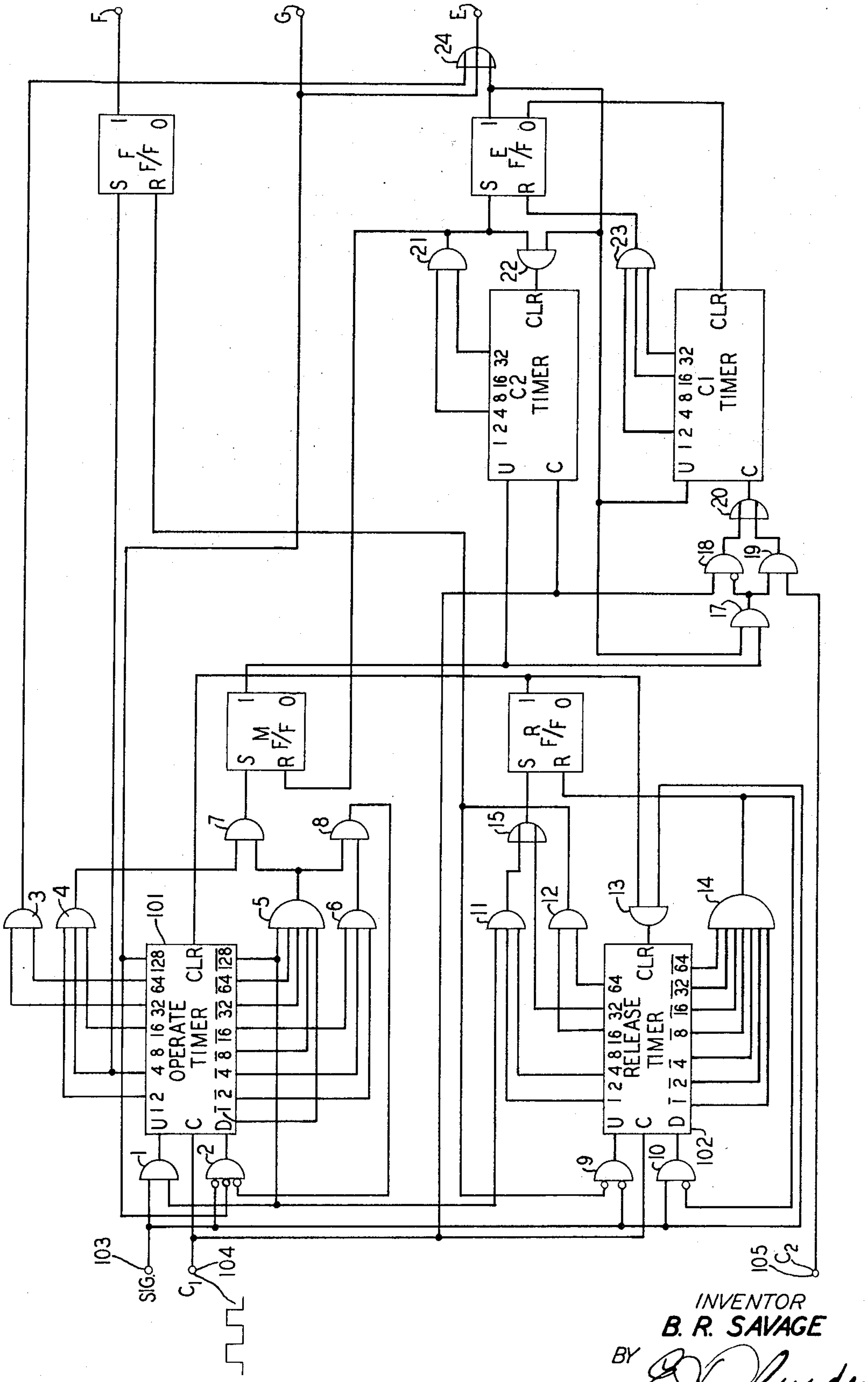
INVENTOR
B. R. SAVAGE
BY
ATTORNEY

DIGITAL CONSTANT-PERCENT-BREAK PULSE CORRECTING SIGNAL TIMER

BACKGROUND OF THE INVENTION

1. Field of the Invention

This invention relates to signal correcting circuits and more particularly to circuits of this type which provide a constant-percent-break for output pulses.

2. Description of the Prior Art

A wide variety of electronic control systems and communication systems employ energizing signals or pulses which are required to conform, within specified limits, to quantitative characteristics such as duration, spacing, level and repetition rate. Depending upon the particular kind of system involved, one or more pulse characteristics may be more critical than others insofar as tolerance to departures from designed parameters is concerned.

In the field of telephony, for example, a pulse train characteristic of particular importance is the percent-break figure. Defined in terms of the common pulse-generating apparatus in the telephone art, percent-break is the ratio of the time during which a dial pulsing contact is open (break) to the total time duration of the dial pulse (break + make) for a complete open and close contact cycle. In some telephone pulse receiver systems it is common to accept pulses even though some of the pulse parameters, including percent-break, have departed somewhat from the designed ideal so long as the pulses are corrected before being passed on to the next unit in the system. One such arrangement is the communication system pulse corrector shown by F. L. Pento in U.S. Pat. application, Ser. No. 763,077, filed Sept. 27, 1968. Heretofore, however, systems of that general type have been based almost exclusively on analog circuit techniques which often require circuits of undue cost and complexity. Such circuits are at times also deficient in terms of both accuracy and dependability.

The general object of the invention is to reduce the complexity and cost and to enhance the accuracy and dependability of pulse correcting arrangements, particularly those arrangements which provide constant-percent-break output pulses, irrespective of variations, within certain limits, of the repetition rate and percent-break of the input pulses.

SUMMARY OF THE INVENTION

The stated object and related objects are achieved in accordance with the principles of the invention by the employment of first and second digital counters and first and second sources of timing control clock signals which operate at first and second rates, respectively. These rates are set in accordance with the minimum and maximum rates of the pulses to be corrected. Operation of the first counter at the first rate is initiated through logic circuitry in response to input pulses falling within acceptable preselected parameter limits. At the conclusion of its timing cycle, the first counter enables the second counter to begin counting at the first rate and resets the aforementioned logic circuitry. Upon the occurrence of the next input pulse, additional circuitry which also includes logic blocks initiates operation of the second counter at the second rate. The difference in time between the operation of the second counter at the first and second rates is thus determined by the pulse repetition rate of the input pulses. In accordance with the invention, the inception of each final output or corrected pulse is marked by an output from the first counter, and the termination of each corrected pulse is marked by an output from the second counter. The principle of operation which allows a circuit in accordance with the invention to achieve constant-percent-break even though the pulse repetition rate of the input increases is that when both counters are in their timing cycle, the first timer is caused to time out more quickly than it normally would. Thus during the overlap interval, the timing cycle of the first timer is shortened as compared to its cycle during no overlap. Accordingly, as the pulsing speed increases, the second timer interval decreases. The degree to which its timing cycle is shortened is governed by the particular percent-break that is desired.

BRIEF DESCRIPTION OF THE DRAWING

The single FIGURE of the drawing is a block diagram of a pulse correcting circuit in accordance with the invention.

DETAILED DESCRIPTION

The pulse corrector circuit shown in the drawing may be employed as a part of a single frequency signaling receiver for a communication system such as a telephone system, for example, and in such an environment would perform substantially the same functions as the pulse corrector disclosed by the F. L. Pento application cited above.

As shown in the drawing, a pulse corrector in accordance with the invention is comprised of four major subunits, namely: an operate timer 101, a release timer 102 and a pair of pulse corrector timers C1 and C2, together with associated logic elements. The timers indicated may also properly be termed "counters" inasmuch as they operate digitally and the two terms are employed herein interchangeably. The system further includes a signal input point 103 to which input signals to be corrected are applied. These signals may, for example, be derived from the detection of oscillatory signal bursts. To initiate operation, a first clock signal $C_1$ in the form of a square wave at a relatively low frequency, 650 Hz for example, is applied to terminal 104, and a second clock signal $C_2$ also in the form of a square wave but at a higher frequency, such as 1,550 Hz, is applied to terminal 105. Outputs from the system are made available at the terminals F, G and E. The F and G outputs, although not essential for an understanding of the features of the invention, are shown and described herein in order to ensure completeness and, more specifically, to indicate the full range of functions that may be performed in accordance with the invention by the operate timer 101 and by the release timer 102 in a signal receiver environment employing the additional C1–C2 timers. The final output pulse train with its constant-percent-break is applied to the output terminal E.

As a preface to a more detailed discussion of overall operation, the system will first be described in terms of its major units, pointing out broadly how each contributes to the functioning of the whole.

OPERATE TIMER

The operate timer 101 has the capability of counting up, indicated by the succession of digits 1, 2, 4, 8, 16, 32, 64 and 128, indicated as a U function, and has the additional capability of counting down, performing the D function as indicated by the similar digit sequence at the bottom of the operate timer clock. The CLR designation indicates the input for a clearing signal. When a signal is present on the input terminal 103, the operate timer 101 counts upward until a count of 128 is reached at which point an output is applied to the G terminal which, in common parlance, establishes the G function and locks the operate timer 101 which then waits to be reset by the release timer 102. The so-called G function (actually the function which is initiated by apparatus, not shown, upon the application of a signal to the G terminal) results in an increase in the hold-over capability of the receiver and disables the signal guard action of the receiver, thus placing the receiver in what may be described as a broadband condition. This function is conventional in signal receivers and is described in further detail in the Pento application cited above. If the input signal at terminal 103 drops below a preselected threshold prior to the establishing of the G function, the operate timer or counter 101 down-counts until the input signal returns or until the counter reaches zero, or until it is reset at the zero state by the release timer 102. Once the counter 101 is in the zero state, it does nothing further until an input signal returns to the input terminal 103.

After four clock pulses, a signal is directed to set the F flip-flop which operates to apply an output to the F terminal. This output is employed conventionally, as shown by Pento, to break the normal voice transmission path in the receiver and to insert a band elimination filter in the signal path. After 22 pulses, flip-flop M is set thereby directing an enabling signal to the C2 timer in the constant-percent-break portion of the circuit. The E terminal is held up after 96 pulses and, as indicated above, the G terminal is set after 128 pulses. The logic fed by the various timed outputs indicated assures that flip-flop M will be set only once during the up-count toward G, through gate 5, and provides a means for detecting and holding the operate timer 101 in the zero state, through gates 5, 6 and 8. The output from gate 8 to the inverted input of gate 2 prevents down-counting through zero. The connection of the G terminal to the inverted input of gate 2 prevents down-counting once the G function is established.

RELEASE TIMER

The release timer 102 performs two primary functions in that it resets the operate timer 101 to the zero state and, at the proper time, resets the F lead. When no input signal has been applied to the input terminal 103 for a period of 123 ms, the system assumes that it is in the talking (rather than the signaling) condition, and the F flip-flop is reset by the output of gate 12. The time of resetting the operate counter 101 is determined by the G function. If the G function has not been established, the operate timer is reset 7.7 ms after the signal has dropped below a preselected threshold. If, however, the signal has previously been present long enough to establish the G function, it is desirable to lengthen the time which elapses before the operate counter is reset. The time is therefore increased to 49 ms in order to prevent noise, holes or spurious gaps in the signal from being interpreted as seizures.

The release timer 102 is a seven-state, up-down counter. When the input signal is absent (also termed as a low signal) the counter counts up, counting pulses from the 650 Hz clock (not shown). If the low signal persists, the counter continues its up-count setting flip-flop R, thereby clearing the operate timer 101. Control of the time at which this action occurs is obtained by feeding the negated output from the G terminal to gate 11. Once flip-flop R has been set, the release timer 102 is reset to the zero state whenever the input signal gain goes high; otherwise, it will simply count back down to the zero state. The down-counting feature allows the circuit to detect and compensate for holes or gaps in the input pulses which are of insufficient length to be interpreted as the end of a break pulse. Gate 14 detects when the release timer has reached the zero state and prevents further down-counting. In addition, when the timer is reset by the presence of an input signal, the output of gate 14 also resets the *R* flip-flop.

CONSTANT-PERCENT-BREAK CIRCUIT

The constant-percent-break portion of the circuit is made up of the timers *C1* and *C2*, the clock logic provided by the gates 17, 18, 19 and 20, the output logic provided by the gates 21, 22 and 23 and the flip-flop E. This portion of the circuit is nearly independent of the incoming pulse train inasmuch as the only information it requires is the acceptance of a pulse by the operate timer 101. Once the input signal has been present or high long enough to set flip-flop *M*, the circuit assumes that a valid pulse has been received and proceeds toward the construction of an output pulse. Flip-flop *M* enables timer *C2* which immediately begins up-counting and continues to count until gate 21 is satisfied. At that time the flip-flop E is set, flip-flop *M* is reset and the *C1* counter is cleared. It is then ready to receive a new pulse. Flip-flop E makes the E lead high and enables timer *C1* which then begins counting pulses of the 650 Hz system clock. If no new pulse is received by the timer *C2*, timer *C1* completes its timing cycle in a normal fashion, resetting the E lead and clearing itself.

The length of the normal timing cycles of the timers *C1* and *C2* is a function of the lowest pulsing speed to be received and the percent-break desired. For example, the lowest speed may be 7.5 pulses per second and the desired percent-break 58. At a speed of 7.5 pulses per second, 58 percent-break requires 77 ms break and 56 ms make. The principle of operation which allows the circuit to achieve constant-percent-break at higher speeds rests upon the action of the *C1* timer in timing out more quickly than it normally would when both timers are in their timing cycle. The degree to which the timing cycle of timer C1 is shortened is governed by the percent-break desired. For a constant 58 percent break, for example, a second clock frequency of 1,550 Hz is required. Control of the counting frequency fed to timer C1 is accomplished by feeding the enabling signals of both timers to gate 17. When both of these signals are present, the output of gate 17 inhibits gate 18 and enables gate 19, thus allowing the 1,550 Hz clock to be fed to the timer. Hence, during the "overlap" interval, the timing cycle of the timer C1 is shortened from that which it has during a no-overlap condition. Accordingly, as the pulsing speed increases, the C1 timer interval is reduced and the result is a constant-percent-break.

DETAILED OPERATION

In the detailed description of operation that follows, certain of the observations made hereinabove with respect to the overall functioning of the key portions of the system are repeated to ensure clarity and continuity.

Initially the operate timer 101 is in its zero state and, as a result, all the negated outputs (outputs indicated along the bottom edge of the block) are high so that the outputs of gates 5, 6 and 7 are also high. The high $\overline{\mathbf{128}}$ output enables gate 1 so that when the input signal is high, the counter begins to up-count. When four clock pulses have been counted, the 4 output goes high which sets the flip-flop F. While the input signal remains high, the counter continues to up-count. If the input signal shifts to low, however, prior to the receipt of 22 clock pulses, the counter begins down-counting until either a. the counter is reset to zero by the release timer (after 7.7 ms of low signal), or b. it reaches the zero state, or c. the signal goes high.

Once the counter has received 22 clock pulses, the circuit assumes that a legitimate input pulse has been received. The outputs of gates 4 and 5 go high which shifts the output of gate 7 to high, thereby setting flip-flop M. The resulting high or ONE output of flip-flop M enables timer C2. Flip-flop M is reset as soon as that timer completes its timing cycle.

If the high input signal still persists, the counter continues up-counting, and when 96 pulses have been received, the circuit is alerted that the G function is about to be established and that the E lead should therefore not be reset at the conclusion of the break timer cycle. This condition is arranged by the action of the OR gate 24 which receives, as inputs, the ONE output of flip-flop E as well as the output of gate 3 which is high after 148 ms of continuous signal. If the signal does persist until 128 pulses have been counted, the G lead goes high. Although gate 3 goes low at the count of 128, the E lead is in effect held up by the G lead. The negated G output ($\overline{\mathbf{128}}$) goes low when the G lead goes high, and that output disables gate 1, preventing further up-counting. The negated G output is also fed to the release timer 102 where it disables gate 11. The effect of this action is to shift the time at which the operate timer 101 will be reset by the release timer 102 from 7.7 ms to 49 ms. The high G lead is also fed back to gate 2 which inhibits the down-counting capability. The counter is thus locked and does nothing further until it is reset to zero by the release timer 102.

The release timer 102 up-counts when the input signal is low and, depending upon how long the signal has been low (condition indicated by the state of flip-flop *R*), either down-counts or is reset when the signal goes high. Initially, the release timer is in its zero state with the output of gate 14 high which disables gate 10 and thus prevents the counter from down-counting to zero. In this state, the output of gate 12 is low, allowing a low-going input signal to enable gate 9. When this action occurs, the counter for release timer 102 begins to up-count. If the signal has not previously been high to establish the G function, the $\overline{\mathbf{128}}$ input to gate 11 will be high. Thus when five clock pulses have been received, gate 11 goes high, causing flip-flop *R* to be set, thereby clearing the operate timer 101. If the input signal should go high prior to the receipt of five clock pulses, the counter simply down-counts to zero. Once flip-flop *R* has been set, however, the circuit assumes that a legitimate make period has been observed and a high input signal will clear flip-flop *R* so that it will be ready to time the next low signal. If the low signal persists for 80 clock pulses (123 ms) the output of gate 12 goes high, resetting flip-flop F and the F lead. Once the G function has been established, gate 11 is inhibited and flip-flop *R* is not set until the signal has been set low for 49 ms.

A fuller understanding of the function of the *C1* and *C2* timers and the associated logic which makes up the constant-percent-break portion of the circuit may be gained from an examination of certain relationships which exist in terms of make and break pulse durations, pulse speed and related factors. The period *P* of the incoming pulse may be written in terms of the delay *C2* introduced by the timer *C2* and some variable *X* as follows:

$$P=C2+X. \quad (1)$$

The variable *X* may then be defined as follows:

$$X=P-C2. \quad (2)$$

The break (*Bk*) value of the outgoing pulse is written in terms of the previously-defined variable *X* and a second variable *Y* as follows:

$$Bk=X+Y, \quad (3)$$

where *Y* is defined in terms of the delay *C1* introduced by a second timer, *C1*, *X* and an "overlap" factor *R*, *R* being the duration of the period when both timers are counting. That is, $$Y=(C1-X)R, R \leq 1. \quad (4)$$

Writing the break in terms of *X* and the definition of *Y* yields the following:

$$Bk=X+(C1\cdot R)-(X\cdot R). \quad (5)$$

From the relationship that make plus break equals the period, an expression for the make may be written as follows:

$$Mk=C2-(C1\cdot R)+(X\cdot R). \quad (6)$$

Thus, $$\text{Break}=\frac{Bk}{Mk+Bk}=\frac{X+(C1\cdot R)-(X\cdot R)}{X+C1\cdot R-X\cdot R+C2-C1\cdot R+X\cdot R} \quad (7)$$

which simplifies to $$\text{Break}=\frac{(C1\cdot R)+X(1-R)}{C2+X} \quad (7a)$$

Substituting $X=P-C2$, gives $$\text{Break}=\frac{(C1\cdot R)+(1-R)(P-C2)}{P} \quad (7b)$$

or $$\text{Break}=\frac{R(C1+C2)-C2+P(1-R)}{P} \quad (8)$$

Thus the break may be written in terms of the period of the incoming pulse train, timers C1 and C2 and the overlap factor $R$.

For a constant-percent-break, it is required that the quantity $$R(C1+C2)-C2=0. \quad (9)$$

Then, $$\text{Percent-Break}=(1-R)X100. \quad (10)$$

Thus for a percent-break of 58, $R = 0.42$. When this value of $R$ is substituted into equation (9), it is found that $$C1/C2=(1-R)/R=0.58/0.42=1.3809. \quad (11)$$

The value of C1 is chosen as the break period, at the percent-break desired, of the longest period to be corrected (the lowest speed). Thus for a minimum speed of 7.5 pps and a break of 58 percent, C1 would equal 77 ms. C2 is then computed to be 55.7 ms. The required timers are realized by utilizing two up-counters and feeding selected outputs to their associated gates in a manner similar to that described for the operate and release timers. It should be noted that timer C1 is not enabled until timer C2 has completed its timing cycle and set flip-flop E. When timer C1 is initially enabled, it is fed pulses of the 650 Hz clock. However, if C2 is enabled while C1 is still in its timing cycle the time remaining before completion of the cycle must be reduced by the overlap factor $R$. This is accomplished by switching in a second clock frequency which is higher than the basic clock by a factor of $1/R$. The result is a constant-break which is equal to $1-R$.

For a digital realization, the equation may also be written in terms of two clock periods, the period of the incoming pulses and the number of clock pulses which must be counted. This gives the following:

$$\text{Break}=\frac{\tau_2(n_1+n_2)-\tau_1 n_2+P\left(1-\frac{\tau_2}{\tau_1}\right)}{P} \quad (12)$$

where $\tau_1$ is the period of the system clock, $\tau_2$ is the period of the clock fed to timer C1 during the overlap period, $P$ is the period of the incoming pulses, and $n_1$ and $n_2$ are the number of pulses which must be counted by timers C1 and C2, respectively.

It is to be understood that the embodiment described herein is merely illustrative of the principles of the invention. Various modifications thereto may be effected by persons skilled in the art without departing from the spirit and scope of the invention.

What is claimed is:

1. A constant percent-break pulse corrector circuit for receiving an input pulse train having a first percent-break ratio and a pulse repetition rate between a first minimum repetition rate and a second maximum repetition rate and for generating an output pulse train having a substantially constant preselected percent-break ratio irrespective of variations in said pulse repetition rate and said first percent-break ratio, comprising, in combination, first means for providing timing control clock signals at said first minimum repetition rate, second means for providing timing control clock signals at said second maximum repetition rate, third means responsive to input pulses for providing a first output indication in the presence of input pulses longer than a preselected minimum duration, a first digital counter jointly responsive to said first and third means and arranged to provide a second output indication after completion of a counting cycle, a second digital counter selectively responsive to said first and said second means and including means for initially operating said second counter at said first rate in the presence of said second output indication and for subsequently operating said second counter at said second rate in the presence of both said first and said second output indications, the difference in time between said initial and said subsequent operation being determined by said pulse repetition rate of said input pulses, and logic circuit means responsive to outputs from said counters for generating said output pulse train.

2. Apparatus in accordance with claim 1 wherein said last named means includes means responsive to an output from said first counter for marking the inception of each corresponding corrected output pulse and means responsive to an output from said second counter for marking the termination of each corresponding corrected output pulse.

3. Apparatus in accordance with claim 2 wherein said last named means includes logic circuitry.

4. Apparatus in accordance with claim 2 wherein the timing period of said second counter is equivalent to the break period at the percent-break desired of the longest pulse period to be accepted for correction.

* * * * *